(12) United States Patent
Nieuwsma et al.

(10) Patent No.: US 11,585,052 B2
(45) Date of Patent: *Feb. 21, 2023

(54) MILLING MACHINE HAVING A HYDRAULIC DAMPENING SYSTEM

(71) Applicant: CATERPILLAR PAVING PRODUCTS INC., Brooklyn Park, MN (US)

(72) Inventors: Derek Peter Nieuwsma, Loretto, MN (US); Nicholas James Argenziano, Otsego, MN (US); Jason William Muir, Andover, MN (US); Timothy Jay Lindholm, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 414 days.

This patent is subject to a terminal disclaimer.

(21) Appl. No.: 16/833,987

(22) Filed: Mar. 30, 2020

(65) Prior Publication Data

US 2021/0301481 A1    Sep. 30, 2021

(51) Int. Cl.
| | | |
|---|---|---|
| *E01C 23/088* | (2006.01) | |
| *E01C 23/12* | (2006.01) | |
| *B60G 17/015* | (2006.01) | |

(52) U.S. Cl.
CPC .......... *E01C 23/088* (2013.01); *E01C 23/127* (2013.01); *B60G 17/0152* (2013.01); *B60G 2500/30* (2013.01)

(58) Field of Classification Search
CPC ........ B60G 2500/116; B60G 2500/322; B60G 17/0152; B60G 17/0424; B60G 2202/154; B60G 2206/422; B60G 2206/4222; B60G 2500/2062; B60G 2500/30; E01C 23/088; E01C 23/127; E02F 9/2217; E02F 9/2228
See application file for complete search history.

(56) References Cited

U.S. PATENT DOCUMENTS

| | | | |
|---|---|---|---|
| 2,926,023 A | 10/1953 | Kraus et al. | |
| 3,888,542 A | 6/1975 | Gowler | |
| 5,147,172 A * | 9/1992 | Hosseini | ............... E02F 9/2217 |
| | | | 414/815 |

(Continued)

*Primary Examiner* — Abby J Flynn
*Assistant Examiner* — Michael A Goodwin
(74) *Attorney, Agent, or Firm* — Finnegan, Henderson, Farabow, Garrett & Dunner, LLP

(57) ABSTRACT

A milling machine may have a frame, first and second ground engagement members connected through respective, vertically adjustable leg columns to a front end of the frame, and third and fourth ground engagement members connected through respective, vertically adjustable leg columns to a rear end of the frame. Each vertically adjustable leg column includes a hydraulic cylinder connecting the frame and the associated ground engagement member. A milling drum is attached to the frame between the front and rear ends. At least one pair of the leg columns connected to the front end of the frame or the leg columns connected to the rear end of the frame includes an accumulator associated with each of the at least one pair of leg columns, a fluid conduit fluidly connecting a bore end of each of the hydraulic cylinders to the associated accumulator, and a control valve disposed in the fluid conduit and configured to control a flow of fluid between the hydraulic cylinders and the associated accumulators.

19 Claims, 6 Drawing Sheets

(56) References Cited

U.S. PATENT DOCUMENTS

| | | | | |
|---|---|---|---|---|
| 5,269,556 | A | * | 12/1993 | Heyring ................. B60G 11/26 |
| | | | | 280/5.513 |
| 5,601,307 | A | | 2/1997 | Heyring et al. |
| 5,865,028 | A | * | 2/1999 | Klauk ................... B01F 23/703 |
| | | | | 60/494 |
| 6,220,613 | B1 | | 4/2001 | Franzini |
| 8,118,316 | B2 | | 2/2012 | Berning et al. |
| 8,814,189 | B2 | | 8/2014 | Vitali et al. |
| 9,206,566 | B2 | | 12/2015 | Killion |
| 2006/0054439 | A1 | * | 3/2006 | Honma .............. B60G 17/0432 |
| | | | | 188/322.21 |
| 2008/0272561 | A1 | * | 11/2008 | Monk .................... B60G 21/06 |
| | | | | 280/124.16 |
| 2013/0257136 | A1 | * | 10/2013 | Held .................... E01C 23/088 |
| | | | | 299/10 |

* cited by examiner

MILLING MACHINE HAVING A HYDRAULIC DAMPENING SYSTEM

TECHNICAL FIELD

The present disclosure relates generally to a milling machine such as a cold planer or a rotary mixer and, more particularly, to a milling machine having a hydraulic dampening system.

BACKGROUND

Road surfaces typically include an uppermost layer of asphalt or concrete on which vehicles travel. Over time, a road surface may wear out or may be damaged, for example, due to the formation of potholes or development of cracks and ruts. The damaged road surface may in turn cause damage to vehicles travelling on the road surface. The damaged road surface can be repaired locally by filling up the potholes, cracks, and/or ruts. However, it is often desirable to replace the worn or damaged road surface with an entirely new road surface. This is usually accomplished by removing a layer of the asphalt or concrete from the roadway and repaving the roadway by laying down a new layer of asphalt or concrete.

A milling machine is often used to remove the layer of asphalt or concrete on the roadway surface. A typical milling machine includes a frame supported on wheels or tracks and including a milling drum attached to the frame. As the milling machine is driven over the existing roadway surface, teeth or cutting tools on the rotating milling drum come into contact with the roadway surface and tear up a layer of the roadway. A milling drum chamber typically encloses the milling drum to contain the milled material. The milled material is typically transported using a conveyor system to an adjacent vehicle, which removes the material from the worksite. Following the milling process, a new layer of asphalt or concrete may be applied on the milled road surface to create a new roadway surface.

In another application, it is sometimes desirable to stabilize or reconstitute the upper layer of a roadway or a worksite. This is usually accomplished by removing the upper layer, mixing it with stabilizing components such as soda, ash, lime, etc., and depositing the mixture back on top of the roadway or worksite. In some implementations, the top layer may be removed by the milling machine and sent to a plant for processing, while a bottom layer may be mixed in with a soil base by a reclaimer. A milling machine, such as a stabilizer or reclaimer is often used for this purpose. Such milling machines also include a frame supported by tracks or wheels and include a milling drum attached to the frame. The milling drum is enclosed in a drum chamber. The cutting tools or teeth on the milling drum tear up the ground and push the removed material toward a rear of the drum chamber. Stabilizing ingredients and/or water are mixed with the milled material, which is then deposited back on to the ground towards the rear of the drum chamber. In some applications of soil stabilization the milling machine may be operating on a surface that never included a road or paved surface. Such applications may include particularly uneven surfaces over which the milling machine must operate.

In both types of milling machines discussed above, the frame is typically located several feet above the ground. An operator typically controls operations of the milling machine from an operator cabin mounted on the frame. When the milling machine is being transported over a worksite or between worksites, one or more of its tracks or wheels may encounter irregularities on the ground surface (e.g. a depression and/or an obstacle on the ground), which may cause one or more sides of the milling machine frame to be suddenly raised or lowered. As discussed above, the problem with uneven ground may be particularly prevalent when a reclaimer is being used on a surface that never included a road or paved surface. Because the operator is located several feet above the ground surface, such sudden height variations may cause discomfort to the operator. It is, therefore, desirable to create a smoother ride and minimize discomfort for a milling machine operator when the milling machine is being transported over a worksite or between worksites.

The milling machines and/or the hydraulic dampening systems of the present disclosure solve one or more of the problems set forth above and/or other problems of the prior art.

SUMMARY

In one aspect, the present disclosure is directed to a milling machine. The milling machine may include a frame. The milling machine may also include a first ground engagement member and a second ground engagement member, each connected through vertically adjustable leg columns to a front end of the frame, and a third ground engagement member and a fourth ground engagement member, each connected through vertically adjustable leg columns to a rear end of the frame. Each vertically adjustable leg column of the milling machine may include a hydraulic cylinder connecting the frame and the associated ground engagement member. Each of the hydraulic cylinders may be configured to adjust a height of the frame relative to a respective one of the ground engagement members. The milling machine may also include a milling drum attached to the frame between the front and rear of the frame. Each vertically adjustable leg column of the milling machine may still further include an accumulator disposed at a bore end of each hydraulic cylinder. A fluid conduit may connect each accumulator to a respective one of the hydraulic cylinders, with a control valve disposed in the fluid conduit for controlling a flow of fluid between the accumulator and the respective one of the hydraulic cylinders.

In another aspect, the present disclosure is directed to a milling machine. The milling machine may include a frame. The milling machine may also include a first ground engagement member and a second ground engagement member, each connected through vertically adjustable leg columns to a front end of the frame, and a third ground engagement member and a fourth ground engagement member, each connected through vertically adjustable leg columns to a rear end of the frame. Each vertically adjustable leg column of the milling machine may include a hydraulic cylinder connecting the frame and the associated ground engagement member. Each of the hydraulic cylinders may be configured to adjust a height of the frame relative to a respective one of the ground engagement members. The milling machine may also include a milling drum attached to the frame between the front and rear of the frame. Each vertically adjustable leg column of the milling machine may still further include an accumulator disposed at a bore end of each hydraulic cylinder. A fluid conduit may connect each accumulator to a respective one of the hydraulic cylinders, with a control valve disposed in the fluid conduit for controlling a flow of fluid between the accumulator and the respective one of the hydraulic cylinders. The milling machine may also include an engine configured to propel the left front ground engagement member, the right front ground engagement member, the left rear ground engagement member, and the right rear ground engagement member in a forward or rearward direction, and rotate the milling drum.

In yet another aspect, the present disclosure is directed to a method of controlling a milling machine. The milling machine may include a first ground engagement member and a second ground engagement member, each connected through vertically adjustable leg columns to a front end of the frame, and a third ground engagement member and a fourth ground engagement member, each connected through vertically adjustable leg columns to a rear end of the frame. Each vertically adjustable leg column of the milling machine may include a hydraulic cylinder connecting the frame and the associated ground engagement member. Each of the hydraulic cylinders may be configured to adjust a height of the frame relative to a respective one of the ground engagement members. The milling machine may also include a milling drum attached to the frame between the front and rear of the frame. Each vertically adjustable leg column of the milling machine may still further include an accumulator disposed at a bore end of each hydraulic cylinder. A fluid conduit may connect each accumulator to a respective one of the hydraulic cylinders, with a control valve disposed in the fluid conduit for controlling a flow of fluid between the accumulator and the respective one of the hydraulic cylinders. The method may include operating the milling machine with the milling drum out of contact with a ground surface. The method may also include determining that hydraulic dampening has been initiated. The method may further include selectively controlling a flow of hydraulic fluid from the hydraulic cylinders of the vertically adjustable leg columns connected to the front end of the frame to their associated accumulators, and/or a flow of hydraulic fluid from the hydraulic cylinders of the vertically adjustable leg columns connected to the rear end of the frame to their associate accumulators.

DETAILED DESCRIPTION

Figure 1:
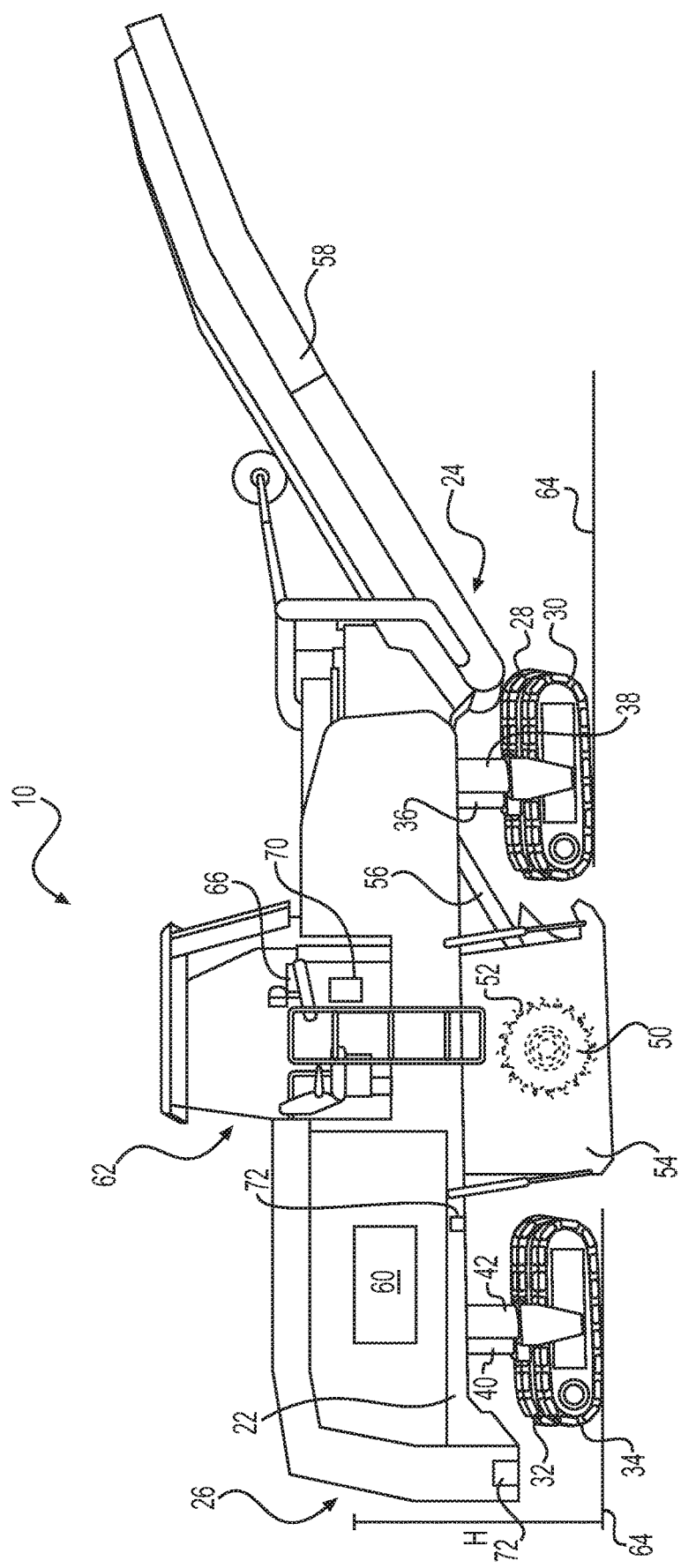
FIG. 1 is an illustration of an exemplary milling machine.
Figure 2:
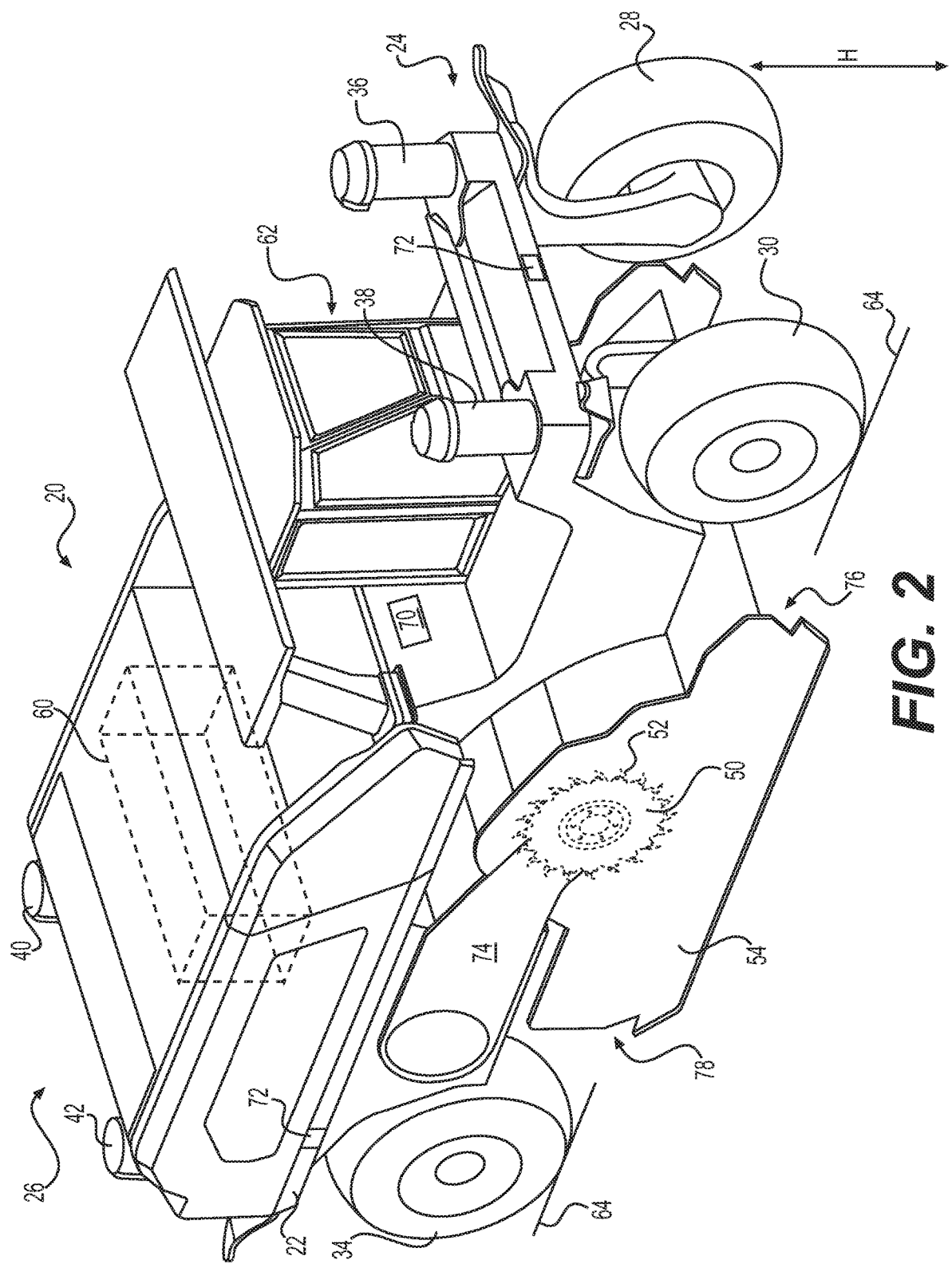
FIG. 2 is an illustration of another exemplary milling machine.

FIGS. 1 and 2 illustrate exemplary milling machines 10 and 20, respectively. In one exemplary embodiment as illustrated in FIG. 1, milling machine 10 may be a cold planer, which may also be referred to as a cold milling machine, a scarifier, a profiler, etc. Milling machine 10 may include frame 22, which may extend from first end 24 to second end 26 disposed opposite first end 24. In some exemplary embodiments, first end 24 may be a front end and second end 26 may be a rear end of frame 22. Frame 22 may have any shape (e.g. rectangular, triangular, square, etc.)

Frame 22 may be supported on one or more ground engagement and propulsion devices. For example, as illustrated in FIG. 1, frame 22 may be supported on ground engagement and propulsion devices 28, 30, 32, 34. Propulsion devices 28, 30, 32, 34 may be equipped with electric or hydraulic motors which may impart motion to propulsion devices 28, 30, 32, 34 to help propel machine 10 in a forward or rearward direction. In one exemplary embodiment as illustrated in FIG. 1, propulsion devices 28, 30, 32, 34 may take the form of tracks, which may include, for example, sprocket wheels, idler wheels, and/or one or more rollers that may support a continuous track. However, it is contemplated that propulsion devices 28, 30, 32, 34 of milling machine 10 may take the form of wheels (see FIG. 2.) In the present disclosure, the terms track and wheel will be used interchangeably and will include the other of the two terms.

Tracks 28, 30 may be located adjacent first end 24 of frame 22 and tracks 32, 34 may be located adjacent second end 26 of frame 22. Track 28 may be spaced apart from track 30 along a width direction of frame 22. Likewise, track 32 may be spaced apart from track 34 along a width direction of frame 22. In one exemplary embodiment as illustrated in FIG. 1, track 28 may be a left front track, track 30 may be a right front track, track 32 may be a left rear track, and track 34 may be a right rear track. Some or all of propulsion devices 28, 30, 32, 34 may also be steerable, allowing machine 10 to be turned towards the right or left during a forward or rearward motion on ground surface 64. Although milling machine 10 in FIG. 1 has been illustrated as including four tracks 28, 30, 32, 34, it is contemplated that in some exemplary embodiments, milling machine 10 may have only one rear track 32 or 34, which may be located generally centered along a width of frame 22.

Frame 22 may be connected to tracks 28, 30, 32, 34 by one or more leg columns 36, 38, 40, 42. For example, as illustrated in FIG. 1, frame 22 may be connected to left front track 28 via leg column 36 and to right front track 30 via leg column 38. Likewise, frame 22 may be connected to left rear track 32 via leg column 40 and to right rear track 34 via leg column 42. One or more of leg columns 36, 38, 40, 42 may be height adjustable such that a height of frame 22 relative to one or more of tracks 28, 30, 32, 34 may be increased or decreased by adjusting a length of one or more of leg columns 36, 38, 40, 42, respectively. It will be understood that adjusting a height of frame 22 relative to one or more of tracks 28, 30, 32, 34 would also adjust a height of frame 22 relative to ground surface 64 on which tracks 28, 30, 32, 34 may be supported.

Milling machine 10 may include milling drum 50, which may be attached to frame 22 between front end 24 and rear end 26. Milling drum 50 may include cutting tools 52 (or teeth 52) that may be configured to cut into and tear up a predetermined thickness of a roadway or the ground. A height of milling drum 50 relative to the ground surface 64 may be adjusted by adjusting a height of one or more leg columns 36, 38, 40, 42. As milling drum 50 rotates, teeth 52 of milling drum 50 may come into contact with the ground or roadway surface, thereby tearing up or cutting the ground or roadway surface. Milling drum 50 may be enclosed within drum chamber 54 which may help contain the material removed by teeth 52 from the ground or roadway surface. Machine 10 may include one or more conveyors 56, 58, which may help transport the material removed by milling drum 50 to an adjacent vehicle such as a dump truck.

Milling machine 10 may include engine 60, which may be attached to frame 22. Engine 60 may be any suitable type of internal combustion engine, such as a gasoline, diesel, natural gas, or hybrid-powers engine. It is contemplated, however, that in some exemplary embodiments, milling machine 10 may be driven at least in part by electrical power. Engine 60 may be configured to deliver rotational power output to one or more hydraulic pumps associated with propulsion devices 28, 30, 32, 34, to milling drum 50, and to the one or more conveyors 56, 58. Engine 60 may also be configured to deliver power to operate one or more other components or accessory devices (e.g. pumps, fans, motors, generators, belt drives, transmission devices, etc.) associated with milling machine 10.

Milling machine 10 may include operator cabin 62, which may be attached to frame 22. As illustrated in FIG. 1, operator cabin 62 may be located at a height "H" above ground surface 64. In some alternative embodiments, operator cabin 62 may be replaced with an operator platform, which may be an open-air platform, with or without a canopy to protect the operator. In some exemplary embodiments, height H may range between about 6 ft to 8 ft above ground surface 64. Operator cabin 62 may include one or more controls 66, which may be used by an operator to operate and/or control milling machine 10. Control 66 may include one or more input devices 66, which may take the form of buttons, switches, sliders, levers, wheels, touch screens, or other input/output or interface devices. Machine 10 may also include controller 70, which may be configured to receive inputs, data, and/or signals from the one or more input devices 66, sensors 72, and or other sensors associated with milling machine 10 and to control the operation of one or more components (e.g. engine 60, milling drum 50, propulsion devices 28, 30, 32, 34, conveyors 56, 58, etc.) Controller 70 may include or be associated with one or more processors, memory devices, and/or communication devices. Controller 70 may embody a single microprocessor or multiple microprocessors, digital signal processors (DSPs), application-specific integrated circuit devices (ASICs), etc. Numerous commercially available microprocessors may be configured to perform the functions of controller 70. Various other known circuits may be associated with controller 70, including power supply circuits, signal-conditioning circuits, and communication circuits, etc.

The one or more memory devices associated with controller 70 may store, for example, data and/or one or more control routines or instructions. The one or more memory devices may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 70 may receive one or more input signals from the one or more input devices 66 and/or sensors 72, and may execute the routines or instructions stored in the one or more memory devices to generate and deliver one or more command signals to one or more of propulsion devices 28, 30, 32, 34, engine 60, milling drum 50, conveyors 56, 58, etc.

Sensor 72 may include, for example, one or more of infrared sensors, ultrasonic sensors, cameras, or other types of sensors that may be configured determine a condition such as roughness, hardness, and/or other characteristics of ground surface 64. Additionally or alternatively, leg cylinder position sensors may be used to provide signals indicative of ground surface conditions. Sensor 72 may be configured to transmit signals to controller 70 wirelessly or by wired connections.

FIG. 2 illustrates another exemplary embodiment of a milling machine. In one exemplary embodiment as illustrated in FIG. 2, milling machine 20 may be a reclaimer, which may also be called soil stabilizer, reclaiming machine, road reclaimer, etc. Like milling machine 10, milling machine 20 may include frame 22, ground engagement and propulsion devices in the form of wheels 28, 30, 32 (not visible in FIG. 2), 34, and leg columns 36, 38, 40, 42. In some exemplary embodiments, one or more leg columns 36, 38, 40, 42 may be height adjustable such that a height of frame 22 relative to one or more of wheels 28, 30, 32, 34 may be increased or decreased by adjusting a length of one or more leg columns 36, 38, 40, 42, respectively. As illustrated in FIG. 2, leg column 36 may connect frame 22 to the left front wheel 28, leg column 38 may connect frame 22 to a right front wheel 30, leg column 40 may connect frame 22 to left rear wheel 32 (not visible in FIG. 2), and leg column 42 may connect frame 22 to right rear wheel 34. Although, milling machine 20 has been illustrated in FIG. 2 as including wheels 28, 30, 32, 34, it is contemplated that milling machine 20 may instead include tracks 28, 30, 32, 34. One or more of wheels 28, 30, 32, 34 may be steerable, allowing milling machine 20 to be turned towards the right or left during a forward or rearward motion on ground surface 64.

Milling drum 50 of milling machine 20 may be located between first end 24 and second end 26. However, unlike milling machine 10, milling drum 50 of milling machine 20 may not be directly attached to frame 22. Instead, as illustrated in FIG. 2 milling drum 50 of milling machine 20 may be attached to frame 22 via arms 74. Arms 74 may include a pair of arms (only one of which is visible in FIG. 2) disposed on either side of milling machine 20. Arms 74 may be pivotably attached to frame 22 and may be configured to be rotatable relative to frame 22. One or more actuators may be connected between frame 22 and arms 74 and may be configured to move arms 74 relative to frame 22. Thus, unlike milling machine 10, milling drum 50 of milling machine 20 may be movable relative to frame 22.

Milling drum 50 of milling machine 20 may include cutting tools 52 (or teeth 52). A height of milling drum 50 above the ground surface may be adjusted by rotating arms 74 relative to frame 22 and/or by adjusting one or more of leg columns 36, 38, 40, 42. As milling drum 50 rotates, teeth 52 may come into contact with and tear or cut the ground or roadway surface. Milling drum 50 may be enclosed within drum chamber 54 which may help contain the material removed by teeth 52 from the ground or roadway surface. Rotation of milling drum 50 may cause the removed material to be transferred from adjacent front end 76 of drum chamber 54 towards rear end 78 of drum chamber 54. Stabilizing components such as ash, lime, soda, water, etc. may be mixed with the removed material and the reconstituted mixture of the milled material and the stabilizing components may be deposited on ground surface 64 adjacent rear end 78 of drum chamber 54.

Like milling machine 10, milling machine 20 may also include engine 60, operator cabin 62, one or more control or input devices 66, controller 70, and one or more sensors 72, all of which may have characteristics similar to those discussed above with respect to milling machine 10. Additionally, it will be understood that as used in this disclosure the terms front and rear are relative terms, which may be determined based on a direction of travel of milling machine 10 or 20. Likewise, it will be understood that as used in this disclosure, the terms left and right are relative terms, which may be determined based on facing the direction of travel of milling machine 10 or 20.

Figure 3:
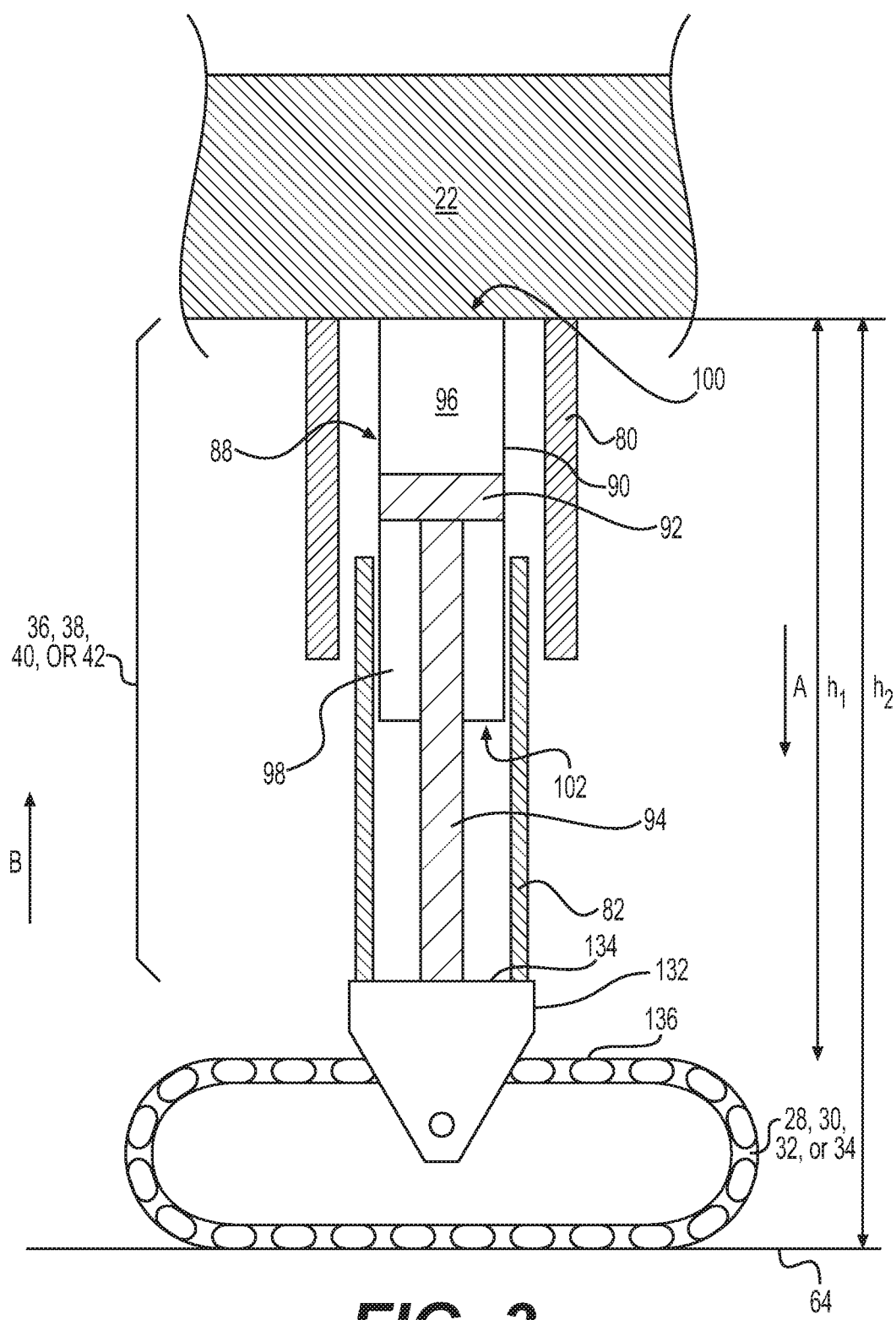
FIG. 3 is a partial cross-section view illustration of an exemplary leg column for the milling machines of FIGS. 1 and 2.

FIG. 3 is a partial cross-sectional view illustration of an exemplary leg column 36, 38, 40, 42 for milling machine 10 or 20. Leg column 36 may include first (or upper) section 80 and second (or lower) section 82. Actuator 88 may be disposed within or outside leg column 36. First section 80 may be attached to frame 22. In one exemplary embodiment, first section 80 may be rigidly attached to frame 22. First section 80 may extend from frame 22 towards track 28. Second section 82 may be attached to track 28 and may extend from track 28 toward frame 22. In one exemplary embodiment as illustrated in FIG. 3, first and second sections 80, 82 may be hollow cylindrical tubes. It is contemplated, however, that first and second sections 80, 82 may have other non-cylindrical shapes. First and second sections 80, 82 may be configured to slidably move relative to each other. In one exemplary embodiment as illustrated in FIG. 3, second section 82 may have a smaller cross-section relative to first section 80 and may be received within first section 80. It is contemplated, however, that in other exemplary embodiments, first section 80 may have a smaller cross-section relative to second section 82 and may be received within second section 82. First and second sections 80, 82 may form a variable height enclosure within which actuator 88 may be located. It is also contemplated, however, that actuator 88 may be located outside the enclosure formed by first and second sections 80, 82.

Actuator 88 may include cylinder 90, piston 92, and rod 94. Cylinder 90 may extend from frame end 100 connected to frame 22 to track end 102 which may be disposed between frame 22 and track 28. Piston 92 may be slidably disposed within cylinder 90 and may divide cylinder 90 into head-end chamber 96 and rod-end chamber 98. That is, piston 92 may be configured to slide within cylinder 90 from adjacent frame end 100 to adjacent track end 102. Head-end chamber 96 may be disposed nearer frame end 100 of cylinder 90 and rod-end chamber 98 may be disposed nearer track end 102 of cylinder 90. Rod 94 may be connected at one end to piston 92. Rod 94 may extend from piston 92, through track end 102 of cylinder 90, and may be connected at an opposite end of rod 94 to track 28.

Actuator 88 may be a single-acting or double-acting hydraulic actuator. For example, one or both of head-end chamber 96 and rod-end chamber 98 of actuator 88 may be configured to receive and hold hydraulic fluid. One or both of head-end chamber 96 and rod-end chamber 98 may be connected to tank 140 (see FIG. 4) configured to store hydraulic fluid. Filling head-end chamber 96 with hydraulic fluid and/or emptying hydraulic fluid from rod-end chamber 98 may cause piston 92 to slidably move within cylinder 90 in a direction shown by arrow "A" from frame end 100 toward track end 102. Piston movement in direction A may result in an increase in a length of actuator 88, causing first and second sections 80 and 82 to slidably move relative to each other thereby increasing a height "$h_1$" of leg column 36. Height $h_1$ may also correspond to a height of frame 22 relative to track 28. An increase in height $h_1$ may correspond with an increase in height "$h_2$" of frame 22 relative to ground surface 64. Similarly, emptying hydraulic fluid from head-end chamber 96 and/or filling rod-end chamber 98 with hydraulic fluid may cause piston 92 to slidably move within cylinder 90 in a direction shown by arrow "B" from track end 102 towards frame end 100. Piston movement in direction B may decrease the length of actuator 88 thereby decreasing a height "$h_1$" of leg column 36, which in turn may decrease a height "$h_2$" of frame 22 relative to ground surface 64. Although the above description refers to leg column 36 and track 28, each of leg columns 38, 40, 42 connected between frame 22 and tracks 30, 32, 34, respectively, may have structural and functional characteristics similar to those described above with respect to leg column 36 and track 28.

Figure 4:
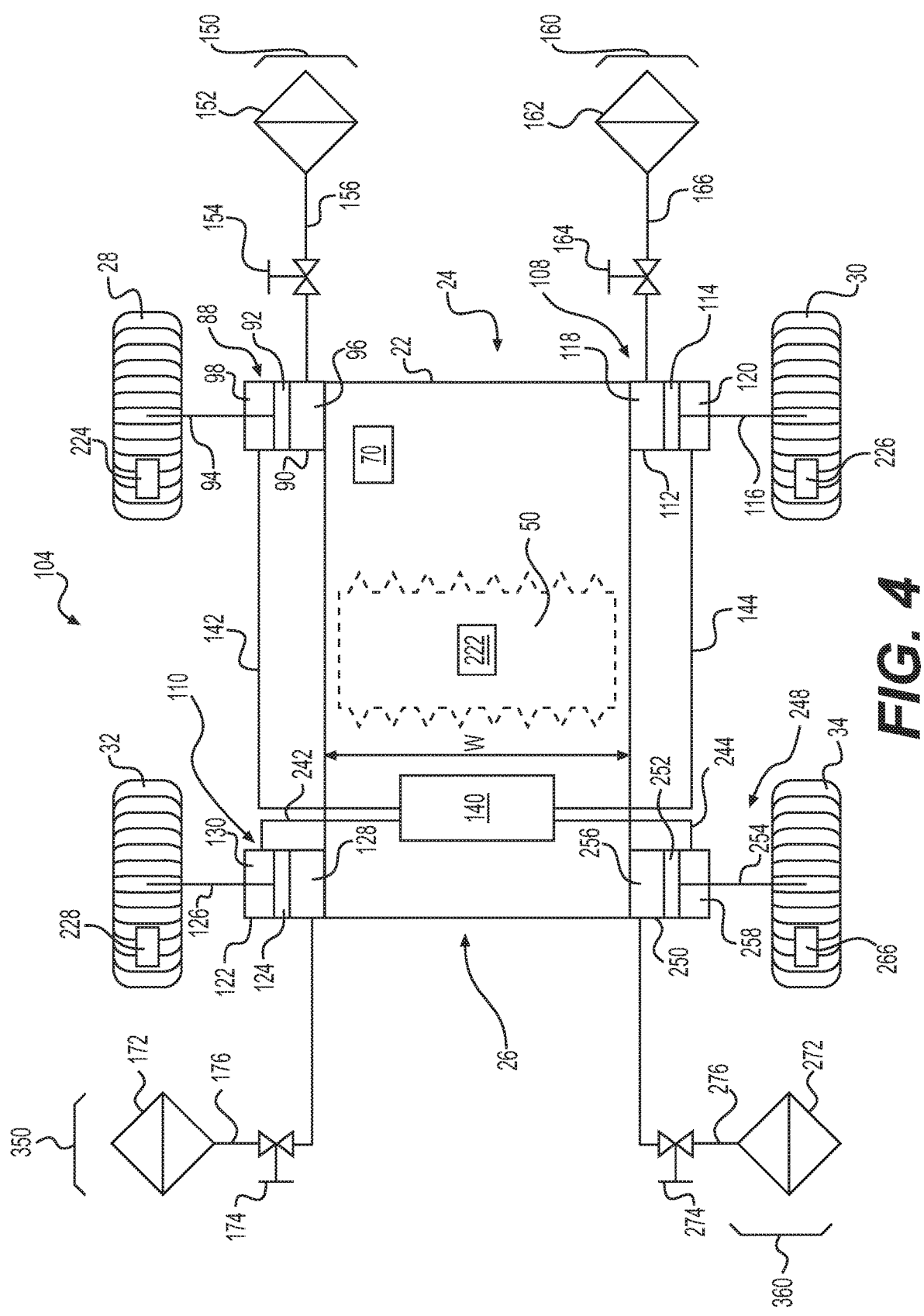
FIG. 4 is a schematic of an exemplary hydraulic dampening system for the milling machines of FIGS. 1 and 2.

FIG. 4 illustrates a schematic of an exemplary hydraulic dampening system 104 for milling machine 10 or 20. As illustrated in FIG. 4, hydraulic dampening system 104 may apply to milling machine 10 or 20 that may include two front tracks (e.g. left front track 28 and right front track 30) and two rear tracks (e.g. left rear track 32 and right rear track 34). Left front track 28 may be connected to frame 22 via leg column 36 (see FIG. 1), right front track may be connected to frame 22 via leg column 38 (see FIG. 1), left rear track 32 may be connected to frame 22 via leg column 40 (see FIG. 1), and right rear track 34 may be connected to frame 22 via leg column 42 (see FIG. 1).

Left front track 28 may be connected to frame 22 via left front actuator 88, right front track 30 may be connected to frame 22 via right front actuator 108, left rear track 32 may be connected to frame 22 via left rear actuator 110, and right rear track 34 may be connected to frame 22 via right rear actuator 248. Actuators 88, 108, 110, and 248 may be located within or outside leg columns 36, 38, 40, and 42, respectively. Left front actuator 88 may be a single-acting or double-acting hydraulic actuator and may have structural and functional characteristics similar to those described above with respect to FIG. 3. Right front actuator 108 may be a single-acting or double-acting hydraulic actuator and may include cylinder 112, piston 114, and rod 116. Piston 114 may be slidably disposed in cylinder 112 and may divide cylinder 112 into head-end chamber 118 and rod-end chamber 120. That is, piston 114 may be configured to slide within cylinder 112. One or both of head-end chamber 118 and rod-end chamber 120 may be configured to hold and receive hydraulic fluid. Cylinder 112 may be connected to frame 22 adjacent head-end chamber 118. Rod 116 may be connected at one end to piston 114 and at an opposite end to track 30. Similarly, left rear actuator 110 may be a single-acting or double-acting hydraulic actuator and may include cylinder 122, piston 124, and rod 126. Piston 124 may be slidably disposed in cylinder 122 and may divide cylinder 122 into head-end chamber 128 and rod-end chamber 130. That is, piston 124 may be configured to slide within cylinder 122. One or both of head-end chamber 128 and rod-end chamber 130 may be configured to hold and receive hydraulic fluid. Cylinder 122 may be connected to frame 22 adjacent head-end chamber 128. Rod 126 may be connected at one end to piston 124 and at an opposite end to track 32. Still further, right rear actuator 248 may be a single-acting or double-acting hydraulic actuator and may include cylinder 250, piston 252, and rod 254. Piston 252 may be slidably disposed in cylinder 250 and may divide cylinder 250 into head-end chamber 256 and rod-end chamber 258. That is, piston 252 may be configured to slide within cylinder 250. One or both of head-end chamber 256 and rod-end chamber 258 may be configured to hold and receive hydraulic fluid. Cylinder 250 may be connected to frame 22 adjacent head-end chamber 256. Rod 254 may be connected at one end to piston 252 and at an opposite end to track 34.

Milling machine 10 or 20 may also include tank 140, which may be configured to store hydraulic fluid. One or more of head-end chambers 96, 118, 128, 256 and/or rod-end chambers 98, 120, 130, 258 may be connected to tank 140 and may receive hydraulic fluid from or direct hydraulic fluid to tank 140. For example, as illustrated in FIG. 4, tank fluid conduit 142 may connect tank 140 with rod-end chamber 98 of actuator 88, tank fluid conduit 144 may connect tank 140 with rod-end chamber 120 of actuator 108, tank fluid conduit 242 may connect tank 140 to rod-end chamber 130 of actuator 110, and tank fluid conduit 244 may connect tank 140 to rod-end chamber 258 of actuator 248. Thus, for example, hydraulic fluid may flow from tank 140 to one or more of rod-end chambers 98, 120, 130, 258 or vice versa. Milling machine 10 or 20 may include additional fluid conduits, control valves, pressure relief valves, pumps, filters and other hydraulic components connecting actuators 88, 108, 110, and/or 248 to tank 140. Discussion of these components in this disclosure is omitted for succinctness and clarity.

Hydraulic dampening system 104 may include damper assemblies 150, 160, 350, 360. In various alternative embodiments, hydraulic dampening system 104 may only include damper assemblies 150, 160 associated with left front actuator 88 and right front actuator 108, respectively, and in other alternative embodiments, hydraulic dampening system 104 may only include damper assemblies 350, 360 associated with left rear actuator 110 and right rear actuator 248, respectively. Left damper assembly 150 may include left accumulator 152, left control valve 154, and left fluid conduit 156. Left accumulator 152 may be connected to left front actuator 88 via left fluid conduit 156. For example, left accumulator 152 may be connected to head-end chamber 96 of left front actuator 88 via left fluid conduit 156. Left control valve 154 may be disposed in fluid conduit 156 between actuator 88 and accumulator 152 and may be configured to control the flow of hydraulic fluid between head-end chamber 96 and accumulator 152. Right damper assembly 160 may include right accumulator 162, right control valve 164, and right fluid conduit 166. Right accumulator 162 may be connected to right front actuator 108 via right fluid conduit 166. For example, right accumulator 162 may be connected to head-end chamber 118 of right front actuator 108 via right fluid conduit 166. Right control valve 164 may be disposed in right fluid conduit 166 between actuator 108 and accumulator 162 and may be configured to control the flow of hydraulic fluid between head-end chamber 118 and accumulator 162. Similarly, left rear damper assembly 350 may include accumulator 172, left rear control valve 174, and fluid conduit 176. Left rear accumulator 172 may be connected to left rear actuator 110 via fluid conduit 166. For example, left rear accumulator 172 may be connected to head-end chamber 128 of left rear actuator 110 via fluid conduit 176. Left rear control valve 174 may be disposed in left rear fluid conduit 176 between actuator 110 and accumulator 172 and may be configured to control the flow of hydraulic fluid between head-end chamber 128 and accumulator 172. Still further, right rear damper assembly 360 may include accumulator 272, right rear control valve 274, and fluid conduit 276. Right rear accumulator 272 may be connected to right rear actuator 248 via fluid conduit 276. For example, right rear accumulator 272 may be connected to head-end chamber 256 of right rear actuator 248 via fluid conduit 276. Right rear control valve 274 may be disposed in right rear fluid conduit 276 between actuator 248 and right rear accumulator 272 and may be configured to control the flow of hydraulic fluid between head-end chamber 256 and accumulator 272.

Although FIG. 4 illustrates four damper assemblies 150, 160, 350, 360 connected to actuators 88, 108, 110, 248, respectively, it is contemplated that in various exemplary embodiments, hydraulic dampening system 104 may include only some (e.g. only the front pair of damper assemblies 150, 160, only the rear pair of damper assemblies 350, 360, or both of the front pair of damper assemblies and the rear pair of damper assemblies). As described above, each of accumulators 152, 162, 172, 272 may be singly connected to actuators 88, 108, 110, 248, respectively. That is, each accumulator 152, 162, 172, or 272 may not be connected to more than one actuator 88, 108, 110, or 248. Alternative implementations may include multiple accumulators used as a dampening system for each actuator or hydraulic leg cylinder. Each accumulator may also be provided with different amounts or the same amount of pre-charge pressure.

Control valves 154, 164, 174, 274 may be two position or proportional type valves having a valve element movable to regulate a flow of hydraulic fluid through fluid conduits 156, 166, 176, 276, respectively. The valve element in control valves 154, 164, 174, 274 may be solenoid-operable to move between a flow-passing position and a flow-blocking position. In the flow-passing position, control valves 154, 164, 174, 274 may permit hydraulic fluid to flow through fluid conduits 156, 166, 176, 276, respectively, substantially unrestricted by control valves 154, 164, 174, 274, respectively. In contrast, in the flow-blocking position, control valves 154, 164, 174, 274 may completely block hydraulic fluid from flowing through fluid conduits 156, 166, 176, 276. The valve element of control valves 154, 164, 174, 274 may also be selectively movable to various positions between the flow-passing and flow-blocking positions to provide for variable flow rates of hydraulic fluid in fluid conduits 156, 166, 176, 276, respectively.

Figure 5B:
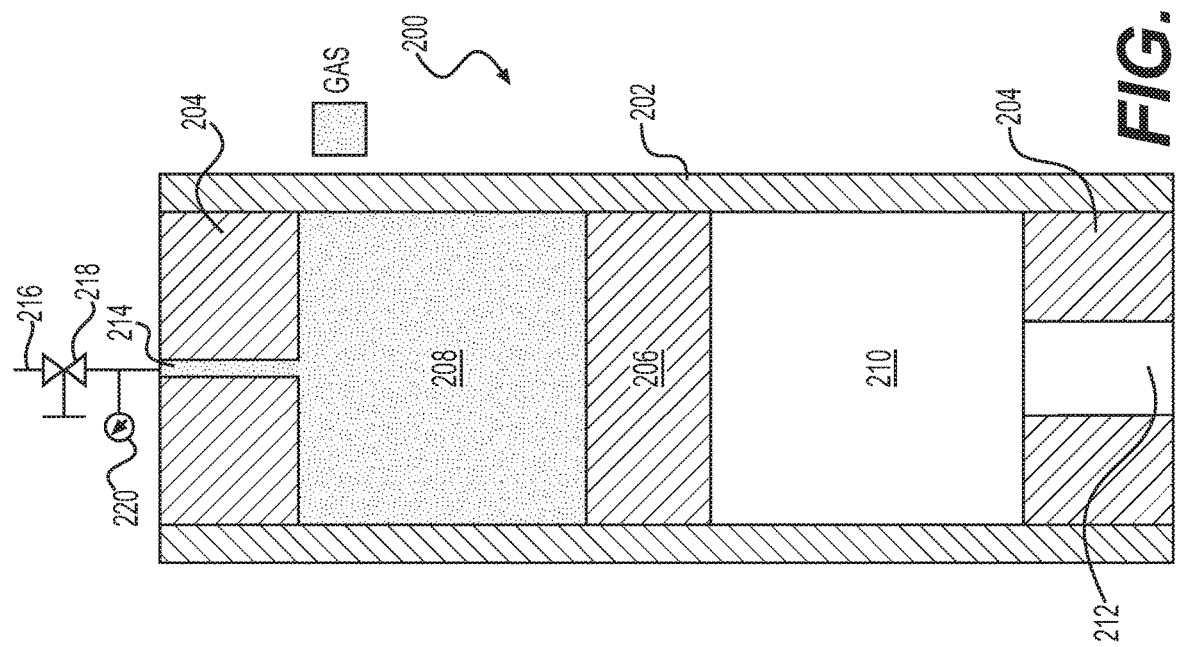
FIG. 5B is a cross-sectional view of another exemplary accumulator for the hydraulic dampening system of FIG. 4.
Figure 5A:
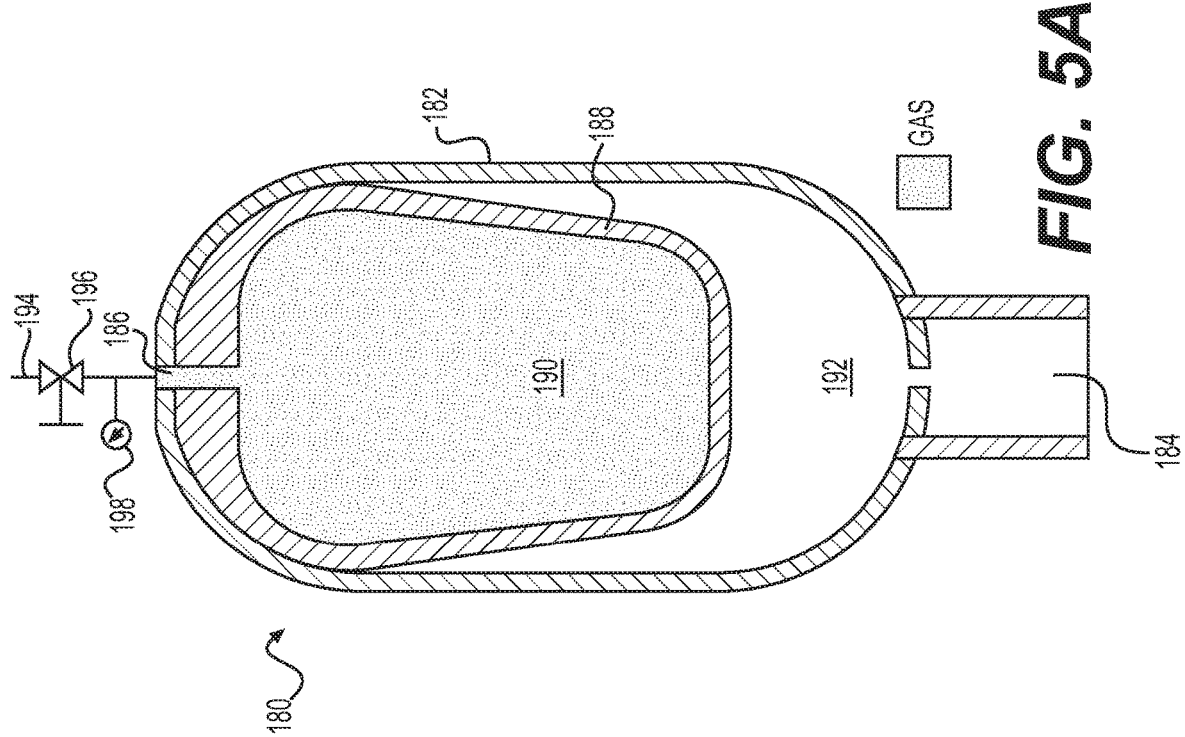
FIG. 5A is a cross-sectional view of an exemplary accumulator for the hydraulic dampening system of FIG. 4.

FIG. 5A illustrates an exemplary accumulator 180. Accumulator 180 may include enclosure 182, having fluid inlet 184 and gas inlet 186. Accumulator 180 may also include bladder 188 disposed within enclosure 182 and configured to divide enclosure 182 into gas enclosure 190 and fluid enclosure 192. In one exemplary embodiment, bladder 188 may be an expansible balloon. Bladder 188 may be configured to enclose a gaseous medium (e.g. gas such as Nitrogen or air). Accumulator 180 may include gas conduit 194 that may be configured to allow gas to flow into or out of gas enclosure 190. Control valve 196 may be disposed in gas conduit 194. Control valve 196 may have structural and functional characteristics similar to those of control valves 154, 164, 174, 274. And, like control valves 154, 164, 174, 274, control valve 196 may permit or block a flow of gas into or out of gas enclosure 190 through gas conduit 194.

The rate at which hydraulic fluid may flow into or out of fluid enclosure 192 may depend on a pressure of the gaseous medium enclosed in gas enclosure 190. For example, when hydraulic fluid flows into fluid enclosure 192, bladder 188 may deform, reducing a volume of gas enclosure 190, thereby compressing the gaseous medium enclosed in bladder 188. The increased pressure of the gaseous medium in bladder 188 may act on bladder 188, reducing a rate at which bladder 188 may deform, which in turn may help reduce a rate of flow of hydraulic fluid into fluid enclosure 192.

The pressure of the gaseous medium enclosed in gas enclosure 190 may also be increased or decreased by allowing the gaseous medium to flow into or out of gas enclosure 190 via gas conduit 194. In some exemplary embodiments, controller 70 may be configured to adjust control valve 196 to control a rate at which the gaseous medium may flow into or out of gas enclosure 190. In some exemplary embodiments, accumulator 180 may include pressure sensor 198, which may be configured to measure a pressure of the gaseous medium in gas enclosure 190. Controller 70 may be configured to selectively adjust a valve element of control valve 196 between the flow-blocking and flow-passing positions based on signals received from pressure sensor 198. It is also contemplated that controller 70 may be configured to selectively adjust the valve element of control valve 196 based on signals received from the one or more input devices 66 and/or signals received from other sensors or components of milling machine 10 or 20.

FIG. 5B illustrates another exemplary embodiment of accumulator 200. Accumulator 200 may include enclosure 202 that may have end walls 204. Accumulator 200 may include piston 206, which may be slidably disposed within enclosure 202 and may be configured to divide enclosure 202 into gas enclosure 208 and fluid enclosure 210. Gas enclosure 208 may be configured to enclose a gaseous medium while fluid enclosure 210 may be configured to enclose hydraulic fluid. Accumulator 200 may include fluid inlet 212 that may allow hydraulic fluid to enter or exit fluid enclosure 210 and gas inlet 214 that may allow the gaseous medium to enter or exit gas enclosure 208. Accumulator 200 may include gas conduit 216 that may be configured to allow the gaseous medium to flow into or out of gas enclosure 208. Control valve 218 may be disposed in gas conduit 216. Control valve 218 may have structural and functional characteristics similar to those of control valves 154, 164, 174, 274. And, like control valves 154, 164, 174, 274, control valve 218 may also either permit or block a flow of gas through gas conduit 216.

The rate at which hydraulic fluid may flow into fluid enclosure 210 may depend on a pressure of the gas in gas enclosure 208. For example, when hydraulic fluid flows into fluid enclosure 210, piston 206 may move in a direction towards gas inlet 214, reducing a volume of gas enclosure 208 and compressing the gaseous medium in gas enclosure 208. The increased pressure of the gaseous medium enclosed in gas enclosure 208 may apply an opposing force on piston 206, reducing a rate at which piston 206 may move towards gas inlet 214. This in turn may reduce a rate at which hydraulic fluid may flow into fluid enclosure 210.

The pressure of the gaseous medium enclosed in gas enclosure 208 may also be increased or decreased by allowing the gaseous medium to flow into or out of gas enclosure 208 via gas conduit 216. In some exemplary embodiments, controller 70 may be configured to adjust control valve 218 to control a rate at which the gaseous medium may flow into or out of gas enclosure 208. In some exemplary embodiments, accumulator 200 may include pressure sensor 220, which may be configured to measure a pressure of the gaseous medium in gas enclosure 208. Controller 70 may be configured to selectively adjust a valve element of control valve 218 between the flow-blocking and flow-passing positions based on signals received from pressure sensor 220. It is also contemplated that controller 70 may be configured to selectively adjust the valve element of control valve 218 based on signals received from the one or more input devices 66 and/or signals received from other sensors or components of milling machine 10 or 20.

Although accumulator 200 has been described as including piston 206, in some exemplary embodiments, piston 206 may be replaced by a diaphragm attached to inner walls of enclosure 202. The diaphragm may separate gas enclosure 208 from fluid enclosure 210. The diaphragm may be configured to deform and change shape based on a pressure of the gaseous medium in gas enclosure 208 and/or the pressure of hydraulic fluid in fluid enclosure 210. A pressure of the gaseous medium in gas enclosure 208 may determine a rate at which diaphragm may deform when acted upon by hydraulic fluid flowing into or out of fluid enclosure 210. The rate of deformation of the diaphragm may in turn determine the rate at which hydraulic fluid may flow into or out of fluid enclosure 210.

Returning to FIG. 4, accumulators 152, 162, 172, 272 may take the form of any of accumulators 180 or 200 discussed above with respect to FIGS. 5A and 5B. Accumulators 152, 162, 172, 272 may be configured to dampen a rate at which a height of frame 22 may change relative to ground surface 64. For example, when left front track 28 passes over an obstacle such as a bump on the ground surface 64, left front track 28 and piston 92 may be forced to move in a direction from ground surface 64 towards frame 22. Such movement of piston 92 may reduce a volume of head-end chamber 96, forcing hydraulic fluid to flow from head-end chamber 96 to accumulator 152 via fluid conduit 156.

A pressure of the gaseous medium in accumulator 152 may determine the rate at which hydraulic fluid may flow from head-end chamber 96 to accumulator 152. For example, as explained above with respect to accumulators 180 and 200, as hydraulic fluid flows into accumulator 152, a gaseous medium in a gas enclosure of accumulator 152 may be compressed. The increased pressure of the gaseous medium in the gas enclosure of accumulator 152 may reduce the rate at which hydraulic fluid may flow into accumulator 152. Additionally or alternatively, controller 70 may be configured to adjust control valve 154 to control (e.g. reduce or increase) the rate at which hydraulic fluid may flow from head-end chamber 96 to accumulator 152. Alternatively, control valve 154 may be set for an optimized amount of flow of hydraulic fluid without imposing any additional restrictions to the flow during operation. Controlling the rate at which hydraulic fluid may flow from head-end chamber 96 to accumulator 152 may also help control the rate at which piston 92 and left front track 28 may move towards frame 22. This in turn may help to reduce a rate at which frame 22 may move towards or away from ground surface 64, which in turn may improve comfort of an operator located in operator cabin 62.

Similarly, when left front track 28 encounters a depression in ground surface 64, piston 92 may be forced to move towards ground surface 64 and away from frame 22. Such movement of piston 92 may cause an increase in a volume of head-end chamber 96 causing hydraulic fluid from accumulator 152 to flow into head-end chamber 96 via fluid conduit 156. A pressure of the gaseous medium in accumulator 152 and/or an amount of opening of control valve 154 may help regulate (e.g. increase or decrease) the rate of flow of hydraulic fluid from accumulator 152 to head-end chamber 96, which may control the rate at which piston 92 may move away from frame 22. This in turn may help to reduce a rate at which frame 22 may move towards or away from ground surface 64, improving comfort of an operator located in operator cabin 62. Although the above description of hydraulic dampening system 104 has been provided in terms of left front track 28 and components of damper assembly 150, it will be understood that movements of piston 114 in cylinder 112 of right front actuator 108, piston 124 in cylinder 122 of left rear actuator 110, and piston 252 in cylinder 250 of right rear actuator 248 corresponding to right front track 30, left rear track 32, and right rear track 34, respectively, would be adjusted in a similar manner by damper assemblies 160, 350, 360, respectively.

As further illustrated in FIG. 4, milling machine 10 or 20 may include drum speed sensor 222 and ground speed sensors 224, 226, 228, 266, associated with left front track 28, right front track 30, left rear track 32, and right rear track 34, respectively. Drum speed sensor 222 may be associated with milling drum 50 and may be configured to measure a rotational speed of milling drum 50 (e.g. rpm or revolutions per minute). Drum speed sensor 222 may be configured to generate and send one or more signals indicative of the rotational speed of milling drum 50 to controller 70. It is also contemplated that controller 70 may additionally or alternatively determine the rotational speed of the milling drum based on other parameters such as rotational speed of the engine, transmission or gear ratio, etc. Additional leg position sensors may also be configured to generate signals indicative of a changing terrain over which the machine is operating, with controller 70 using this input as well for providing control commands to one or more of the accumulator control valves.

Ground speed sensors 224, 226, 228, 266 may be associated with left front track 28, right front track 30, left rear track 32, right rear track 34, respectively, and may be configured to measure a speed (e.g. feet per second, miles per hour, etc.) at which tracks 28, 30, 32, 34 may be propelled over ground surface 64. Ground speed sensors 224, 226, 228, 266 may be configured to generate one or more signals indicative of a ground speed of each of the associated tracks, and may send the one or more signals to controller 70. It is contemplated, however, that controller 70 may additionally or alternatively determine a ground speed of milling machine 10 or 20 in other ways, for example, using GPS sensors, inertial sensors, flow rate or pressure of hydraulic fluid in hydraulic motors associated with tracks 28, 30, 32, 34, etc.

In some exemplary embodiments, control valves 154, 164, 174, 274 may be initially fully closed so that hydraulic dampening system 104 may be deactivated. Hydraulic dampening system 104 may be activated by causing one or more of control valves 154, 164, 174, 274 to be opened from a fully closed position. The one or more control valves may be opened from their respective fully closed positions by controller 70 based on signals received from one or more of input devices 66, drum speed sensor 222, ground speed sensors, and/or any other sensors associated with milling machine 10 or 20. For example, an operator may engage one or more input devices 66 for activating hydraulic dampening system 104. In response to signals received from input devices 66, controller 70 may selectively open one or more of control valves 154, 164, 174, 274 allowing one or more of accumulators 152, 162, 172, 272, respectively, to regulate flows of hydraulic fluid into or out of head-end chambers 96, 118, 128, 256, respectively.

Additionally or alternatively, in some exemplary embodiments, controller 70 may selectively open one or more of control valves 154, 164, 174, 274 based on a rotational speed of milling drum 50. For example, controller 70 may selectively open one or more of control valves 154, 164, 174, 274 when the rotational speed of milling drum 50 determined, for example, by drum speed sensor 222 exceeds a threshold drum speed. In other exemplary embodiments, controller 70 may selectively open one or more of control valves 154, 164, 174, 274 based on a ground speed determined, for example, by one or more of ground speed sensors 224, 226, 228, 266. For example, controller 70 may selectively open one or more of control valves 154, 164, 174, 274 when the ground speed exceeds a threshold ground speed of milling machine 10 or 20.

Although FIG. 4 illustrates four damper assemblies 150, 160, 350, 360 connected to actuators 88, 108, 110, 248, respectively, it is contemplated that in various exemplary embodiments, hydraulic dampening system 104 may include only some (e.g. any one or any two) or all of damper assemblies 150, 160, 350, 360. It is also contemplated that in some exemplary embodiments, hydraulic dampening system 104 may include fewer than four damper assemblies 150, 160, 350, 360. For example, in some exemplary embodiments, head-end chambers 128, 256 may be connected to each other, and one accumulator may be connected to both of these head-end chambers, or rod-end chambers 98, 120 may be connected to each other and one accumulator may be connected to both of these rod-end chambers. Additionally or in the alternative, some embodiments may only include a pair of damper assemblies 150, 160 associated with actuators 88, 108 of leg columns 36, 38 at one side of frame 22 (such as at a front end of milling machine 10 or 20), or only a pair of damper assemblies 350, 360 associated with actuators 110, 248 of leg columns 40, 42 at an opposite side of frame 22 (such as at a rear end of milling machine 10 or 20).

As illustrated in FIGS. 1 and 2, milling machine 10 or 20 may include one or more sensors 72 configured to determine a condition such as roughness, hardness, porosity, and/or other characteristics of ground surface 64. Controller 70 may be configured to adjust the valve element in one or more of control valves 154, 164, 174, 274 such that accumulators 152, 162, 172, 272 may provide different levels of hydraulic dampening based on the characteristics of ground surface 64 determined, for example, by the one or more sensors 72. For example, controller 70 may be configured to adjust the valve element in one or more of control valves 154, 164, 174, 274 such that accumulators 152, 162, 172, 272 may provide increased hydraulic dampening when ground surface 64 is relatively hard as compared to when ground surface is relatively soft. In particular, controller 70 may be configured to selectively adjust the valve element such that control valves 154, 164, 174, 274 allow a higher flow rate of hydraulic fluid into or out of head-end chambers 96, 118, 128, or 256 when ground surface 64 is relatively hard as compared to when ground surface is relatively soft. Alternatively, each of the control valves may be configured to simply open or close depending on a command received from controller 70.

It is also contemplated that in some exemplary embodiments, controller 70 may be configured to selectively adjust the valve element in control valves 154, 164, 174, and/or 274 based on a level of hydraulic dampening requested by an operator. An operator may be able to use input device 66 to specify a desired level of dampening. For example, input device 66 may be a button, lever, wheel, slider, touch screen element, etc., which may have multiple positions corresponding to different levels of dampening (e.g. low, medium, high). When, for example, controller 70 receives a signal from input device 66 indicating that a low level of dampening is desired, controller 70 may open the one or more control valves 154, 164, 174, 274 to allow a relatively low flow rate of hydraulic fluid into or out of head-end chambers 96, 118, 128, 256 respectively. In contrast, when, for example, controller 70 receives a signal from input device 66 indicating that a high level of dampening is desired, controller 70 may adjust the one or more control valves 154, 164, 174, 274 to their flow-passing positions to allow hydraulic fluid to flow into or out of head-end chambers 96, 118, 128, 256 respectively, without restriction. When, for example, controller 70 receives a signal from input device 66 indicating that a medium level of dampening is desired, controller 70 may adjust the one or more control valves 154, 164, 174, 274 by an amount which may range in between the fully-blocking and fully-passing positions of the respective control valves. Although, only three levels of dampening have been described, it is contemplated that controller 70 may be configured to adjust the one or more control valves 154, 164, 174, 274 to achieve more than three levels of dampening. Changes to the amounts of dampening may also be achieved by allowing an operator to control whether an orifice is included in the flow path, or the size of an orifice.

It is also contemplated that controller 70 may determine a level of dampening based on a ground speed of milling machine 10 or 20. For example, controller 70 may allow a relatively higher level of dampening at higher ground speeds compared to lower ground speeds. Controller 70 may also determine the level of dampening based on other parameters such as engine speed, engine torque or power, drum speed, drum torque or power, hydraulic pressure in one or more hydraulic motors, etc.

A method of hydraulic dampening operating milling machine 10 or 20 with hydraulic dampening system 104 will be described in more detail below.

INDUSTRIAL APPLICABILITY

The hydraulic dampening system 104 of the present disclosure may be used on milling machine 10 or 20 to reduce an amount of movement of a frame 22 of milling machine 10 or 20 relative to ground surface 64, when one or more of tracks 28, 30, 32, 34 run over irregularities (e.g. bump or depression) in ground surface 64. By reducing the amount of movement or tilt of frame 22 relative to ground surface 64, the disclosed hydraulic dampening system 104 may help improve operator comfort as milling machine 10 or 20 is transported over a worksite or from one worksite to another worksite. Additionally, the dampening system according to various embodiments of this disclosure may improve the performance of a soil reclamation or stabilization job as a result of enabling a more consistent depth of cut across the width of the machine.

Figure 6:
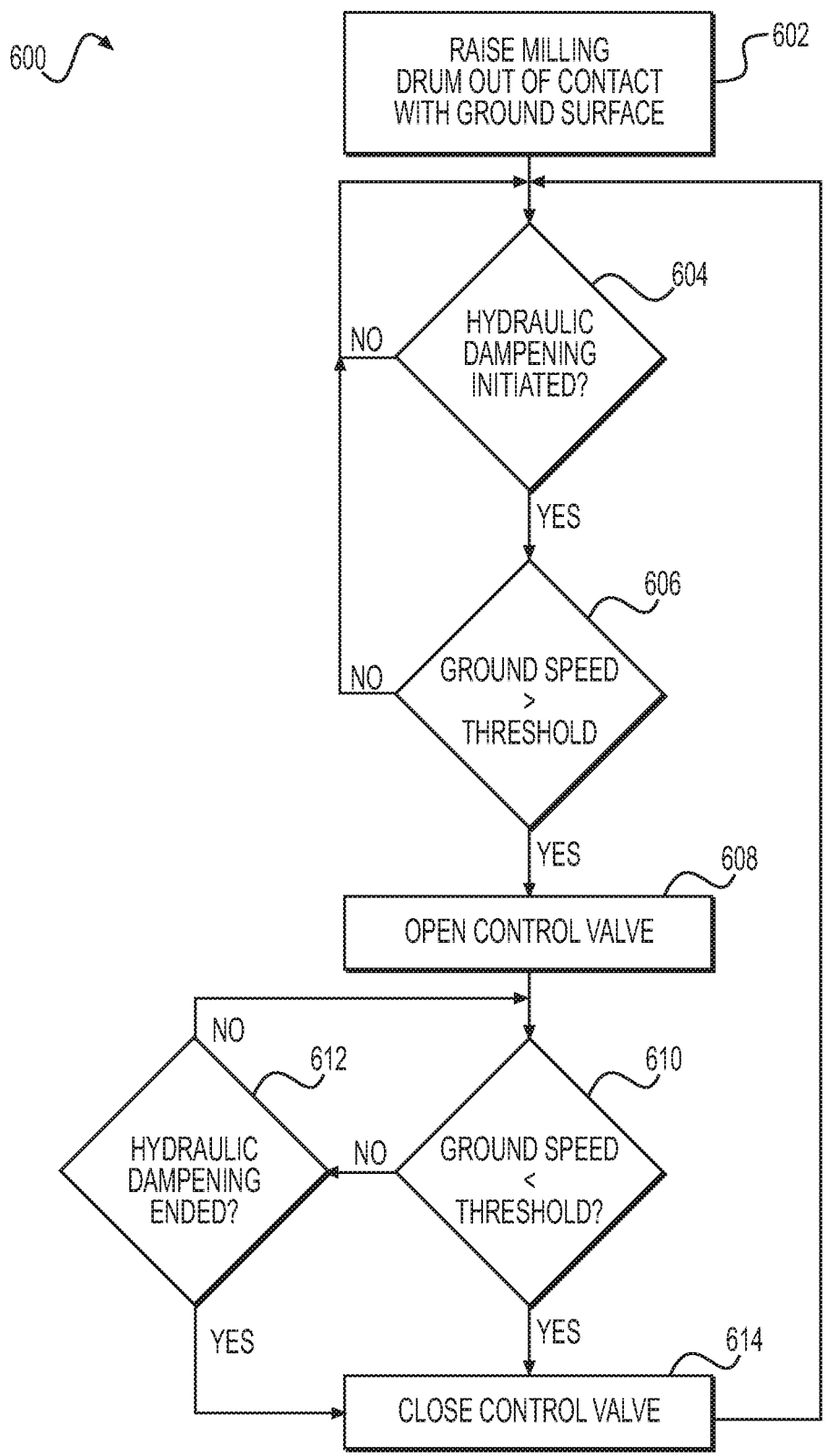
FIG. 6 is an exemplary method of operating the machines of FIGS. 1 and 2.

FIG. 6 illustrates an exemplary method 600 of operating milling machine 10 or 20 with hydraulic dampening system 104 while milling machine 10 or 20 travels over ground surface 64. The order and arrangement of steps of method 600 is provided for purposes of illustration. As will be appreciated from this disclosure, modifications may be made to method 600 by, for example, adding, combining, removing, and/or rearranging the steps of method 600. Method 600 may be executed by controller 70. Although method 600 is described below with reference to left front actuator 88 and left front damper assembly 150, method 600 and its steps as described below and as illustrated in FIG. 6 are equally applicable to right front actuator 108, left rear actuator 110, and right rear actuator 248, and damper assemblies 160, 350, 360.

Method 600 may include a step of raising milling drum 50 out of contact with ground surface 64 (Step 602). An operator may perform such an operation, for example, before transporting milling machine 10 or 20 from one worksite to another worksite. The operator may do so to ensure, for example, that milling drum teeth 52 do not damage ground surface 64 as milling machine 10 or 20 is being transported from one location to another. Controller 70 may receive signals from one or more input devices 66 indicating that an operator desires to raise frame 22 of milling machine 10 or 20 such that teeth 52 of milling drum 50 are clear of ground surface 64. Controller 70 may cause one or more pumps to pump hydraulic fluid from tank 140 into one or more of head-end chambers 96, 118, 128, and/or 256 to increase heights $h_1$, $h_2$, thereby raising frame 22. Additionally or alternatively on milling machine 20, controller 70 may cause one or more actuators connected to arms 74 to be operated so that arms 74 may be pivoted towards frame 22 to raise milling drum 50 out of contact with ground surface 64.

Method 600 may include a step of determining whether hydraulic dampening has been initiated (Step 604). Operator cabin 62 may include an input device 66 (e.g. button, switch, lever, touch screen, etc.) which may be configured to initiate hydraulic dampening in one position and turn off (or end) hydraulic dampening in another position. Controller 70 may monitor signals from the one or more input devices 66 to determine whether hydraulic dampening has been initiated. In some embodiments, step 604 may be omitted and controller 70 may determine whether to initiate hydraulic dampening based on drum speed, ground speed, or other parameters associated with milling machine 10 or 20.

When controller 70 determines that hydraulic dampening has not been initiated (Step 604: NO), controller 70 may return to step 604 to monitor the one or more input devices 66. When controller 70 determines, however, that hydraulic dampening has been initiated (Step 604: YES), controller 70 may proceed to step 606. Controller 70 may determine that hydraulic dampening has been initiated, for example, when an operator toggles input device 66 to a position associated with initiation of hydraulic dampening.

Method 600 may include a step of determining whether a ground speed of machine 10 or 20 is greater than a threshold ground speed (Step 606). Controller 70 may receive signals from one or more of ground speed sensors 224, 226, 228, 266. Controller 70 may determine a ground speed of milling machine 10 or 20 from the measurements (or signals) received from the ground speed sensors. Controller 70 may determine the ground speed based on a maximum or minimum value reported by the ground speed sensors, by averaging the values reported by the ground speed sensors, or by performing known mathematical operations on the values reported by the ground speed sensors. It is also contemplated that controller 70 may determine a ground speed of milling machine 10 or 20 in other ways, for example, by using GPS sensors, inertial sensors, hydraulic fluid flow rate or pressure of the hydraulic fluid in one or more hydraulic motors associated with the tracks or wheels, or based on parameters such as engine power, milling drum torque, etc.

Controller 70 may determine whether the ground speed of milling machine 10 or 20 is greater than a threshold ground speed. The threshold ground speed may be predetermined and preset in controller 70, determined by controller 70 based on one or more algorithms or instructions stored in a memory associated with controller 70, or may be input using input device 66 by an operator of milling machine 10 or 20. When controller 70 determines that the ground speed does not exceed a threshold ground speed (Step 606: NO), controller 70 may return to step 604 to monitor the one or more input devices 66. When controller 70 determines, however, that the ground speed is greater than the threshold ground speed (Step 606: YES), controller 70 may proceed to step 608. Thus, controller 70 may help ensure that hydraulic dampening is activated only when milling machine 10 or 20 is travelling at a sufficiently high ground speed (e.g. above the threshold ground speed). At ground speeds less than the threshold ground speed, it may not be necessary to activate hydraulic dampening because irregularities on ground surface 64 may cause minimal or no operator discomfort at those ground speeds.

Method 600 may include a step of opening one or more of control valves 154, 164, 174, 274 (Step 608). Controller 70 may activate hydraulic dampening system 104 by moving the valve element of the one or more of control valves 154, 164, 174, 274 from the flow-blocking position to allow hydraulic fluid to flow out of or into one or more of accumulators 152, 162, 172, 272, from one or more head-end chambers 96, 118, 128, and/or 256. Opening the one or more control valves 154, 164, 174, 274 in this manner may allow accumulators 152, 162, 172, 272 to regulate a rate at which pistons 92, 114, 124, and/or 252 move in their respective cylinders 90, 112, 122, and/or 250, respectively. This in turn may help reduce the rate at which frame 22 may move towards or away from ground surface 64, thereby improving operator comfort.

Method 600 may include a step of determining whether the ground speed of milling machine 10 or 20 has decreased below the threshold ground speed (Step 610). Controller 70 may determine the ground speed of milling machine 10 or 20 in a manner similar to that discussed above with respect to, for example, Step 606. When controller 70 determines that the ground speed is greater than or equal to the threshold ground speed (Step 606: YES), controller 70 may proceed to step 612 of determining whether hydraulic dampening has been ended. When controller 70 determines, however, that the ground speed is less than the threshold ground (Step 606: YES), controller 70 may proceed to step 614 of deactivating hydraulic dampening system 104.

Method 600 may include a step of determining whether hydraulic dampening has ended (Step 612). Controller 70 may monitor signals from the one or more input devices 66 to determine whether hydraulic dampening has been ended by, for example, the operator. For example, an operator may toggle an input device 66 to a position associated with turning off of the hydraulic dampening. When controller 70 determines that hydraulic dampening has been ended (Step 612: YES), controller 70 may proceed to step 614 of deactivating hydraulic dampening system 104. When controller 70 determines, however, that hydraulic dampening has not been ended (Step 612: NO), controller 70 may return to step 610.

Method 600 may include a step of closing control valves 154, 164, 174, 274 (Step 614) to deactivate hydraulic dampening system 104. For example, step 614 may be performed by controller 70 when an operator has provided an input using one or more input devices 66 to end hydraulic dampening. Step 614 may also be performed by controller 70 when, for example, the ground speed of milling machine 10 or 20 is less than the threshold ground speed. Controller 70 may move valve elements in control valves 154, 164, 174, 274 to their respective flow-blocking positions, thereby blocking flow of hydraulic fluid to or from accumulators 152, 162, 172, 272, respectively. Blocking the flow of hydraulic fluid in this manner may prevent accumulators 152, 162, 172, 272 from regulating a rate of flow of hydraulic fluid into or out of head-end chambers 96, 118, 128, and/or 256 thereby eliminating the hydraulic dampening effect provided by accumulators 152, 162, 172, 272. After completing step 614, method 600 may return to step 604.

It will be apparent to those skilled in the art that various modifications and variations can be made to the disclosed milling machine and hydraulic dampening systems. Other embodiments will be apparent to those skilled in the art from consideration of the specification and practice of the disclosed milling machine and hydraulic dampening systems. It is intended that the specification and examples be considered as exemplary only, with a true scope being indicated by the following claims and their equivalents.

What is claimed is:

1. A milling machine, comprising:
   a frame;
   a first ground engagement member and a second ground engagement member, each of the first and second ground engagement members being connected through a respective, vertically adjustable leg column to a first end of the frame;
   a third ground engagement member and a fourth ground engagement member, each of the third and fourth ground engagement members being connected through a respective, vertically adjustable leg column to a second end of the frame disposed opposite the first end of the frame;
   each vertically adjustable leg column comprising:
      a hydraulic cylinder connecting the frame and the associated ground engagement member, the hydraulic cylinder being configured to adjust a height of the frame relative to the associated ground engagement member, the hydraulic cylinder including a head-end chamber, a rod-end chamber, and a piston separating the head-end and the rod-end chambers;
   a milling drum attached to the frame between the first and second ends;
   at least one of the vertically adjustable leg columns connected to the first end of the frame or to the second end of the frame further comprising:
      an accumulator;
      a fluid conduit fluidly connecting only the head-end chamber of an associated hydraulic cylinder to the accumulator; and
      a control valve disposed in the fluid conduit, the control valve being configured to control a flow of fluid between the associated hydraulic cylinder and the accumulator.

2. The milling machine of claim 1, further including:
   a tank configured to store hydraulic fluid; and
   a tank fluid conduit connecting the rod-end chamber of the hydraulic cylinder to the tank.

3. The milling machine of claim 1, wherein the accumulator includes:
   a gas enclosure configured to enclose a gaseous medium; and
   a fluid enclosure configured to hold a hydraulic fluid received from the hydraulic cylinder, the gas enclosure and the fluid enclosure being separated from each other.

4. The milling machine of claim 3, wherein the fluid conduit connects the fluid enclosure of the accumulator with the hydraulic cylinder.

5. The milling machine of claim 3, wherein the gas enclosure and the fluid enclosure are separated by an accumulator piston.

6. The milling machine of claim 3, wherein the gas enclosure and the fluid enclosure are separated by a diaphragm.

7. The milling machine of claim 3, wherein the gas enclosure includes a bladder enclosing the gaseous medium, the bladder separating the gas enclosure and the fluid enclosure.

8. The milling machine of claim 3, further including a gas control valve configured to control a flow of gaseous medium into or out of the gas enclosure.

9. A milling machine, comprising:
   a frame;

a first ground engagement member and a second ground engagement member, each of the first and second ground engagement members being connected through a respective vertically adjustable leg column to a front end of the frame with respect to a direction of travel of the machine;

a third ground engagement member and a fourth ground engagement member, each of the third and fourth ground engagement members being connected through a respective vertically adjustable leg column to a rear end of the frame disposed opposite the front end of the frame;

each vertically adjustable leg column comprising a hydraulic cylinder connecting the frame and the associated ground engagement member, the hydraulic cylinder being configured to adjust a height of the frame relative to a respective one of the ground engagement members, the hydraulic cylinder including a head-end chamber, a rod-end chamber, and a piston separating the head-end and the rod-end chambers;

a milling drum attached to the frame between the front and rear ends;

an engine configured to:
propel the first, second, third, and fourth ground engagement members in a forward or rearward direction, and
rotate the milling drum;

at least one of the vertically adjustable leg columns connected to the front end of the frame or to the rear end of the frame further comprising:
an accumulator;
a fluid conduit fluidly connecting only the head-end chamber of an associated hydraulic cylinder to the accumulator;
a control valve disposed in the fluid conduit, the control valve being configured to control a flow of fluid between the associated hydraulic cylinder and the accumulator; and
a controller configured to selectively adjust the control valve.

10. The milling machine of claim 9, further including:
a tank configured to store hydraulic fluid; and
a tank fluid conduit connecting the rod-end chamber of the hydraulic cylinder to the tank.

11. The milling machine of claim 9, wherein the accumulator includes:
a gas enclosure configured to enclose a gaseous medium; and
a fluid enclosure configured to hold a hydraulic fluid received from the hydraulic cylinder, the gas enclosure and the fluid enclosure being separated from each other.

12. The milling machine of claim 11, wherein the fluid conduit connects the fluid enclosure of the accumulator with the hydraulic cylinder.

13. The milling machine of claim 11, wherein the gas enclosure and the fluid enclosure are separated by one of an accumulator piston or a diaphragm.

14. The milling machine of claim 11, further including a gas control valve configured to control a flow of gaseous medium into or out of the gas enclosure.

15. The milling machine of claim 14, wherein the controller is further configured to selectively adjust the gas control valve.

16. The milling machine of claim 9, further including:
a speed sensor configured to measure a ground speed of the milling machine, wherein
the controller is configured to selectively open the control valve when the ground speed exceeds a threshold ground speed.

17. The milling machine of claim 16, further including:
a drum speed sensor configured to measure a rotational speed of the milling drum, wherein
the controller is configured to selectively open the control valve when the rotational speed is less than a threshold drum speed.

18. A method of controlling a milling machine, wherein the milling machine comprises:
a frame;
a first ground engagement member and a second ground engagement member, each of the first and second ground engagement members being connected through a respective, vertically adjustable leg column to a first end of the frame;
a third ground engagement member and a fourth ground engagement member, each of the third and fourth ground engagement members being connected through a respective, vertically adjustable leg column to a second end of the frame disposed opposite the first end of the frame;
each vertically adjustable leg column comprising a hydraulic cylinder connecting the frame and the associated ground engagement member, the hydraulic cylinder being configured to adjust a height of the frame relative to a respective one of the ground engagement members, the hydraulic cylinder including a head-end chamber, a rod-end chamber, and a piston separating the head-end and the rod-end chambers;
a milling drum attached to the frame between the first and second ends;
at least one of the vertically adjustable leg columns connected to the first end of the frame or to the second end of the frame further comprising:
an accumulator;
a fluid conduit fluidly connecting only the head-end chamber of an associated hydraulic cylinder to the accumulator; and
a control valve disposed in the fluid conduit, the control valve being configured to control a flow of fluid between the associated hydraulic cylinder and the accumulator, the method comprising:
operating the milling machine with the milling drum out of contact with a ground surface;
determining that hydraulic dampening has been initiated; and
selectively controlling a flow of hydraulic fluid from the associated hydraulic cylinder.

19. The method of claim 18, wherein selectively controlling further includes:
at least one of determining, using a ground speed sensor, a ground speed of the milling machine, or determining, using a rotational speed sensor, a rotational speed of the milling drum; and at least one of
selectively opening, using a controller, a control valve disposed in a fluid conduit connecting one of the hydraulic cylinders and the associated accumulator when the ground speed is larger than a ground speed threshold, or
selectively opening, using the controller, a control valve disposed in the fluid conduit connecting one of the hydraulic cylinders and the associated accumulator when the rotational speed is less than a drum speed threshold.

* * * * *